Oct. 11, 1938.  T. A. GRAHAM ET AL  2,132,564
DRIP LIP TUBING
Filed Dec. 21, 1936
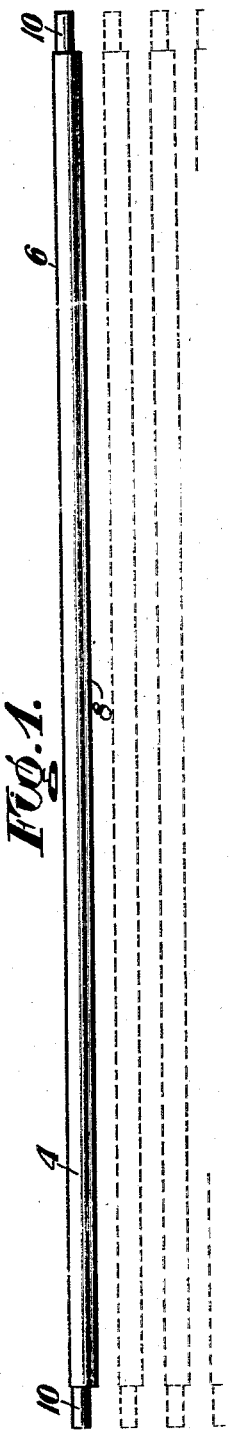
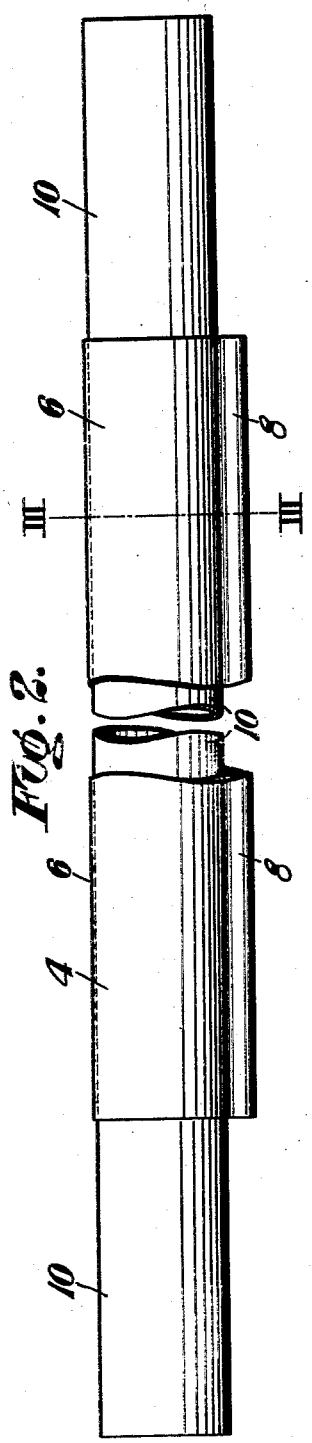
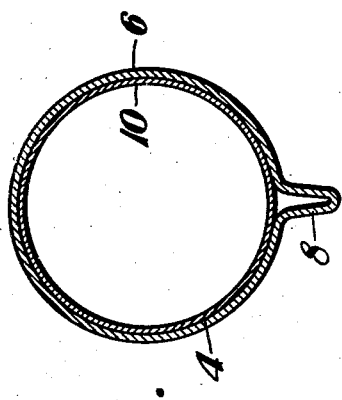
Inventors:
THOMAS A. GRAHAM and
HERBERT W. MOLLISON,
by: their Attorneys.

Patented Oct. 11, 1938

2,132,564

UNITED STATES PATENT OFFICE 2,132,564

DRIP LIP TUBING

Thomas A. Graham, Ellwood City, Pa., and Herbert W. Mollison, Highland Park, Ill., assignors to National Tube Company, a corporation of New Jersey Application December 21, 1936, Serial No. 117,104

1 Claim. (Cl. 257—179)

This invention relates to drip lip tubing, and particularly refers to drip lip tubing that is provided with an inner tubular member.

The object of this invention is to provide a novel tubular article which has an easily cleaned bore.

The above and further objects will be apparent by referring to the following description and the accompanying drawing, in which:

Figure 1 is an elevation of one embodiment of my invention;

Figure 2 is an enlarged broken elevation of Figure 1; and

Figure 3 is a section on line III—III of Figure 2.

Referring to the accompanying drawing, the numeral 4 indicates a tubular article which is adapted to be used in milk coolers, liquid regenerators and the like. A seamless tube 6, preferably made of stainless steel, comprises the outer surface of the tubular article 4. Means are provided for causing liquids poured onto the tubular article 4 to flow or drip therefrom at a given place in the wall of the tube 6 and may comprise a fin or rib-like drip lip 8 which preferably projects radially therefrom. The tube 6 is formed in such a manner that the entire wall thereof is distorted at the drip lip 8 but the remainder of the wall of the tube 6 remains round. This drip lip is preferably formed by making a fold in the side wall of the tube.

In order to provide a readily and easily cleaned bore for the tubular article 4, a tube 10 is secured inside the tube 6. The tube 10 is preferably made of stainless steel and is provided with a smoothly polished inside surface. The tube 10 is within the tube 6 and secured thereto by means of sweating or welding, or by drawing or pressing by any other suitable means so that the two tubes fit tightly together and are made integral. The outer surface of the tube 10 should be in intimate contact with substantially all of the inner surface of the tube 6. Then, due to the metallic composition of, and intimate contact between, the tubes 6 and 10, heat is readily transferred between the inner and outer surfaces of the tubular article 4. The lengths of the tubes 6 and 10 are preferably adjusted, as shown in the drawing, so that the tube 10 extends beyond both ends of the tube 6.

The tubular article 4 has been tested and found to transfer heat between the inner and outer surfaces thereof with a minimum amount of heat loss.

The drip lip 8 is an important feature of the tubular article 4 as any liquids poured over the tubular article 4 tend to flow or drip therefrom. In actual use the tubular articles 4 are adapted to carry either a hot or a cold liquid in the tube 10 and are preferably positioned immediately above or below one another with the drip lips 8 extending downwardly therefrom. Then, any liquid which is allowed to flow onto the uppermost one of the tubular articles 4 flows over the maximum amount of surface area of each of the tubular articles 4 so that a maximum amount of heat can be transferred between their inner and outer surfaces.

While we have shown and described a specific embodiment of our invention, it will be understood that we do not wish to be limited exactly thereto, since various modifications may be made without departing from the scope of the invention as defined by the following claim.

We claim:

A tubular unit adapted to be used in a liquid regenerator, said unit comprising a tube provided with a radially outwardly extending rib-like drip lip in the wall thereof, said drip lip comprising an outwardly bent portion of said tube extending longitudinally and continuously thereof, and a second tube securely assembled within the first named tube so that the outer surface of said second tube contacts substantially the entire inner surface of said first named tube.

THOMAS A. GRAHAM.
HERBERT W. MOLLISON.